US012620611B2

(12) United States Patent
Shinozaki et al.

(10) Patent No.: US 12,620,611 B2
(45) Date of Patent: May 5, 2026

(54) FUEL CELL UNIT

(71) Applicant: TOYOTA JIDOSHA KABUSHIKI KAISHA, Toyota (JP)

(72) Inventors: Yoshihiro Shinozaki, Toyota (JP); Masayuki Ito, Sunto-gun (JP); Keita Kinoshita, Susono (JP); Hirofumi Kanazawa, Toyota (JP); Yugo Ichida, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 512 days.

(21) Appl. No.: 18/329,623

(22) Filed: Jun. 6, 2023

(65) Prior Publication Data

US 2024/0014429 A1     Jan. 11, 2024

(30) Foreign Application Priority Data

Jul. 5, 2022     (JP) ................................. 2022-108244

(51) Int. Cl.
*H01M 8/241*        (2016.01)
*H01M 8/0202*       (2016.01)
*H01M 8/10*         (2016.01)
*H02J 7/00*         (2026.01)
*H02M 7/00*         (2006.01)

(52) U.S. Cl.
CPC ......... *H01M 8/241* (2013.01); *H01M 8/0269* (2013.01); *H02J 7/855* (2026.01); *H02M 7/003* (2013.01); *H01M 2008/1095* (2013.01)

(58) Field of Classification Search
None
See application file for complete search history.

(56) References Cited

U.S. PATENT DOCUMENTS

2018/0097341 A1*   4/2018  Fiebig ..................... H02J 3/00

FOREIGN PATENT DOCUMENTS

JP        2008311038 A      12/2008

* cited by examiner

*Primary Examiner* — Colin W. Slifka
(74) *Attorney, Agent, or Firm* — Dickinson Wright, PLLC

(57) ABSTRACT

A fuel cell unit includes: a fuel cell module; and a power converter. The fuel cell module includes a first fuel cell module including a first fuel cell stack that is a stack of first single cells, and a second fuel cell module including a second fuel cell stack that is a stack of second single cells. The power converter includes a first power converter, and a second power converter. The first power converter is located on a first surface of the first fuel cell module. The second power converter is located on a first surface of the second fuel cell module. The first surfaces face each other. A first normal direction to the first surfaces is orthogonal to a stacking direction of the first single cells and the second single cells.

5 Claims, 5 Drawing Sheets

FIG. 6A
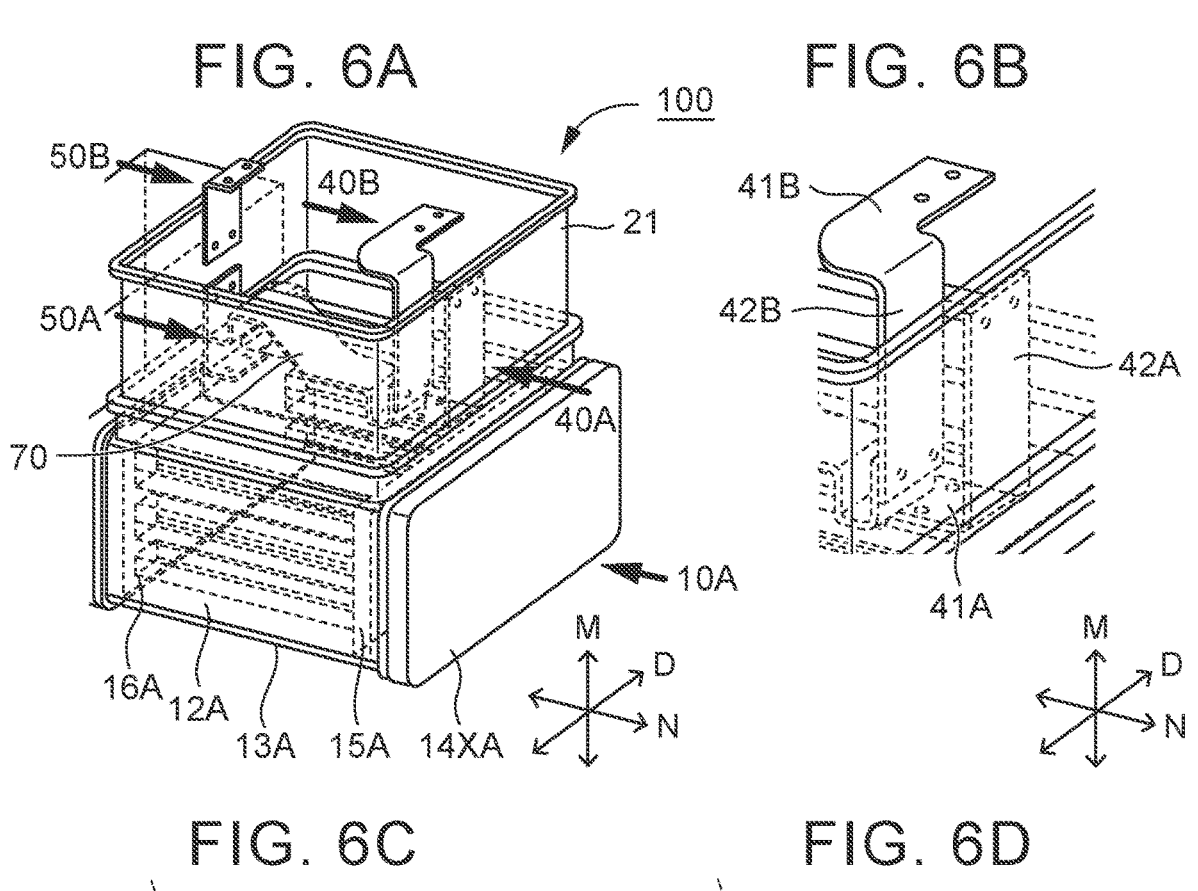
FIG. 6B
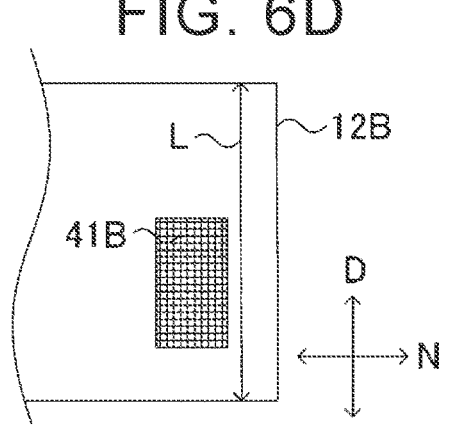
FIG. 6C
FIG. 6D
FIG. 6E
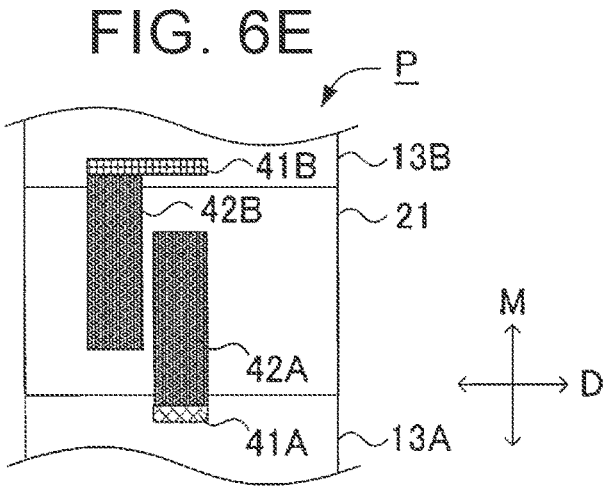

FIG. 7A
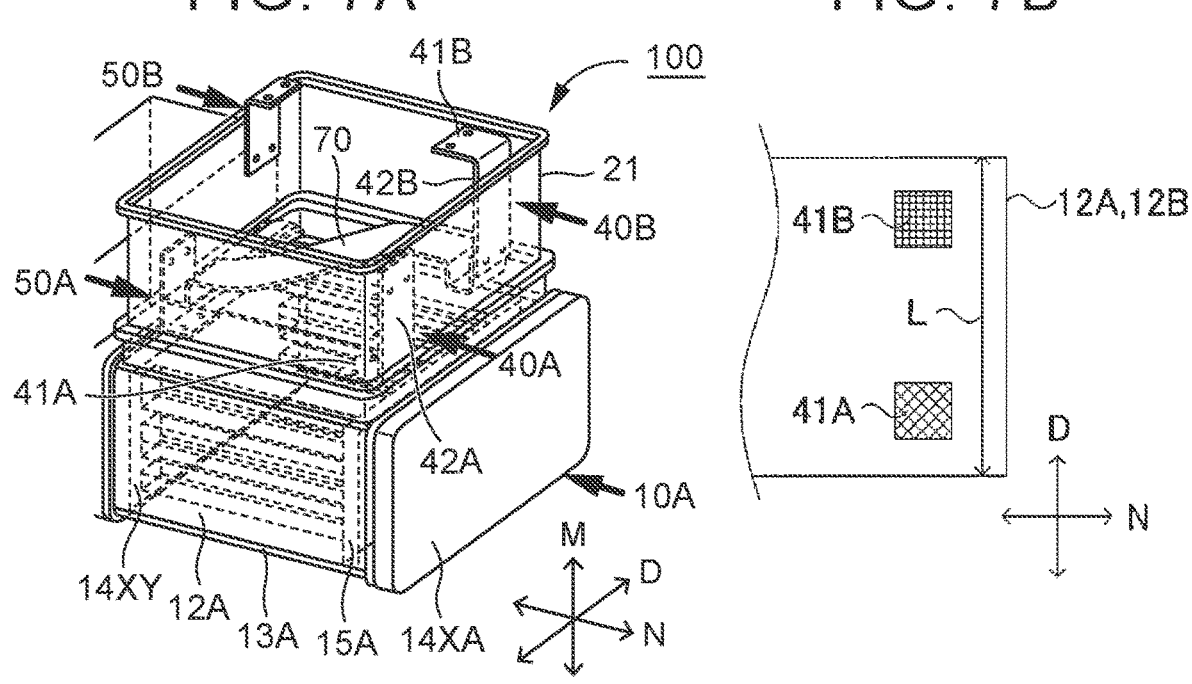
FIG. 7B
FIG. 7C
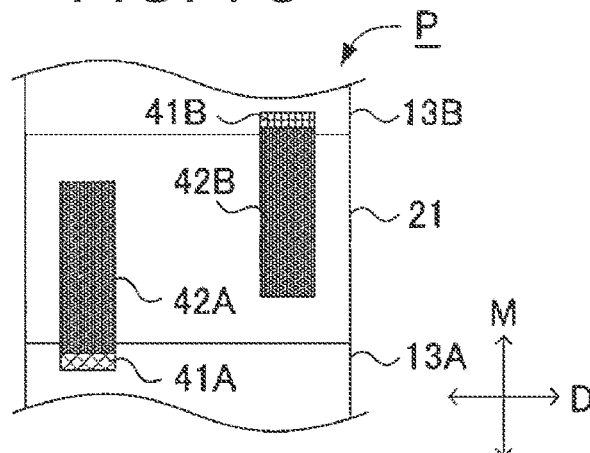
FIG. 8
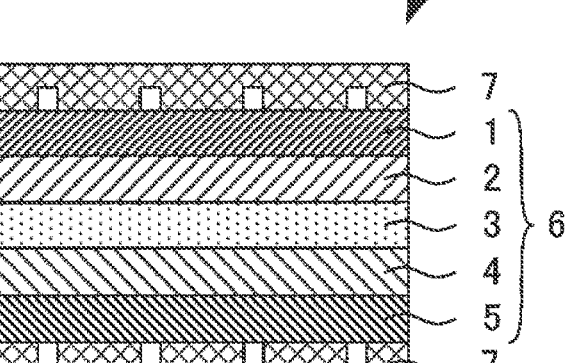

FUEL CELL UNIT

CROSS-REFERENCE TO RELATED APPLICATION

This application claims priority to Japanese Patent Application No. 2022-108244 filed on Jul. 5, 2022, incorporated herein by reference in its entirety.

BACKGROUND

1. Technical Field

The present disclosure relates to fuel cell units.

2. Description of Related Art

A fuel cell is a cell that generates electrical energy through a chemical reaction between an oxidant gas containing oxygen and a fuel gas containing hydrogen. A cell (single cell) that is a basic unit of a fuel cell (fuel cell stack) typically includes a membrane electrode assembly (MEA) that is composed of a solid polymer electrolyte membrane and electrode catalyst layers formed on both sides of the solid polymer electrolyte membrane. Gas diffusion layers (GDLs) are located on both sides of the electrode catalyst layers, and separators having gas channels are located on both sides of the gas diffusion layers.

A fuel cell unit is composed of at least a fuel cell stack and a power converter. For example, Japanese Unexamined Patent Application Publication No. 2008-311038 (JP 2008-311038 A) discloses a fuel cell system in which at least two surfaces of a power conversion device are covered by a power supply device including a fuel cell.

SUMMARY

In the case where a fuel cell unit is mounted on, for example, a fuel cell electric vehicle (FCEV), it is possible to mount a fuel cell unit including a plurality of fuel cell stacks in response to a demand for high output. However, such a fuel cell unit does not have good mountability (installability). The present disclosure provides a fuel cell unit with good mountability.

A first aspect of the present disclosure provides a fuel cell unit. This fuel cell unit is a fuel cell unit including a fuel cell module and a power converter configured to convert power of the fuel cell module. The fuel cell module includes: a first fuel cell module including a first fuel cell stack that is a stack of a plurality of first single cells; and a second fuel cell module including a second fuel cell stack that is a stack of a plurality of second single cells. The power converter includes: a first power converter configured to convert power of the first fuel cell module; and a second power converter configured to convert power of the second fuel cell module. The first power converter is located on a first surface of the first fuel cell module, and the second power converter is located on a first surface of the second fuel cell module. The first surface of the first fuel cell module and the first surface of the second fuel cell module face each other. A first normal direction to the first surface of the first fuel cell module and the first surface of the second fuel cell module is orthogonal to a stacking direction of the first single cells and the second single cells.

In the fuel cell unit of the first aspect, the first power converter and the second power converter may be housed in separate power converter cases.

A second aspect of the present disclosure provides a fuel cell unit. This fuel cell unit is a fuel cell unit including a fuel cell module and a power converter configured to convert power of the fuel cell module. The fuel cell module includes: a first fuel cell module including a first fuel cell stack that is a stack of a plurality of first single cells; and a second fuel cell module including a second fuel cell stack that is a stack of a plurality of second single cells. The power converter includes a common power converter configured to convert power of the first fuel cell module and to convert power of the second fuel cell module. The common power converter is located on a first surface of the first fuel cell module and is also located on a first surface of the second fuel cell module. The first surface of the first fuel cell module and the first surface of the second fuel cell module face each other. A first normal direction to the first surface of the first fuel cell module and the first surface of the second fuel cell module is orthogonal to a stacking direction of the first single cells and the second single cells.

In the fuel cell unit of the first aspect, both the first converter and the second power converter may be housed in a single power converter case.

In the fuel cell unit of the second aspect, the common power converter may be housed in a single power converter case.

In the fuel cell unit of the second aspect, the first fuel cell module may include a first positive terminal plate located on a positive electrode side of the first fuel cell stack, a first negative terminal plate located on a negative electrode side of the first fuel cell stack, and a first fuel cell case configured to house the first fuel cell stack, the first positive terminal plate, and the first negative terminal plate. The second fuel cell module may include a second positive terminal plate located on a positive electrode side of the second fuel cell stack, a second negative terminal plate located on a negative electrode side of the second fuel cell stack, and a second fuel cell case configured to house the second fuel cell stack, the second positive terminal plate, and the second negative terminal plate. The fuel cell unit may further include a first positive terminal connected to the first positive terminal plate and protruding from the first fuel cell case toward the power converter, a first negative terminal connected to the first negative terminal plate and protruding from the first fuel cell case toward the power converter, a second positive terminal connected to the second positive terminal plate and protruding from the second fuel cell case toward the power converter, and a second negative terminal connected to the second negative terminal plate and protruding from the second fuel cell case toward the power converter. The first positive terminal may include a first base connected to the first positive terminal plate, and a first protruding portion protruding from the first base of the first positive terminal toward the power converter. The first negative terminal may include a second base connected to the first negative terminal plate, and a second protruding portion protruding from the second base of the first negative terminal toward the power converter. The second positive terminal may include a third base connected to the second positive terminal plate, and a third protruding portion protruding from the third base of the second positive terminal toward the power converter. The second negative terminal may include a forth base connected to the second negative terminal plate, and a forth protruding portion protruding from the forth base of the second negative terminal toward the power converter. The fuel cell unit may satisfy either or both of the following conditions (1) and (2):

(1) the first protruding portion and the third protruding portion are located so as not to overlap each other as viewed in plan in the stacking direction, and (2) the second protruding portion and the forth protruding portion are located so as not to overlap each other as viewed in plan in the stacking direction.

In the fuel cell unit of the second aspect, the fuel cell unit may satisfy at least the condition (1), and the first base and the third base may be located so as to at least partially overlap each other as viewed in plan in the first normal direction.

In the fuel cell unit of the second aspect, the fuel cell unit may satisfy at least the condition (2), and the second base and the forth base may be located so as to at least partially overlap each other as viewed in plan in the first normal direction.

In the fuel cell unit of the second aspect, the fuel cell unit may satisfy at least the condition (1), and the first base and the third base may be located so as not to overlap each other as viewed in plan in the first normal direction.

In the fuel cell unit of the second aspect, the fuel cell unit may satisfy at least the condition (2), and the second base and the forth base may be located so as not to overlap each other as viewed in plan in the first normal direction.

In the fuel cell unit of the second aspect, the fuel cell unit may satisfy at least the condition (1) and satisfy the following condition (3): (3) the first protruding portion and the third protruding portion are located on a same section perpendicular to the stacking direction.

In the fuel cell unit of the second aspect, the fuel cell unit may satisfy at least the condition (2) and satisfy the following condition (4): (4) the second protruding portion and the forth protruding portion are located on a same section perpendicular to the stacking direction.

The fuel cell unit of the first aspect may further include: a first auxiliary device configured to assist in operation of the first fuel cell module; and a second auxiliary device configured to assist in operation of the second fuel cell module. The first auxiliary device may be located on a second surface of the first fuel cell module. The second auxiliary device may be located on a second surface of the second fuel cell module. A second normal direction to the second surface of the first fuel cell module and the second surface of the second fuel cell module may be orthogonal to the first normal direction to the first surface of the first fuel cell module and the first surface of the second fuel cell module. The first auxiliary device and the second auxiliary device may face each other.

In the fuel cell unit of the first aspect, the first auxiliary device may protrude beyond the first fuel cell module toward the power converter in the first normal direction to the first surface of the first fuel cell module and the first surface of the second fuel cell module, and the second auxiliary device may protrude beyond the second fuel cell module toward the power converter in the first normal direction to the first surface of the first fuel cell module and the first surface of the second fuel cell module.

The fuel cell unit of the second aspect may further include: a first auxiliary device configured to assist in operation of the first fuel cell module; and a second auxiliary device configured to assist in operation of the second fuel cell module. The first auxiliary device may be located on a second surface of the first fuel cell module. The second auxiliary device may be located on a second surface of the second fuel cell module. A second normal direction to the second surface of the first fuel cell module and the second surface of the second fuel cell module may be orthogonal to the first normal direction to the first surface of the first fuel cell module and the first surface of the second fuel cell module. The first auxiliary device and the second auxiliary device may face each other.

In the fuel cell unit of the second aspect, the first auxiliary device may protrude beyond the first fuel cell module toward the power converter in the first normal direction to the first surface of the first fuel cell module and the first surface of the second fuel cell module, and the second auxiliary device may protrude beyond the second fuel cell module toward the power converter in the first normal direction to the first surface of the first fuel cell module and the first surface of the second fuel cell module.

The present disclosure can provide a fuel cell unit with good mountability.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a partial perspective view illustrating the fuel cell unit according to the present disclosure;

FIG. 6B is a partial enlarged view illustrating the fuel cell unit according to the present disclosure;

FIG. 6C is a partial plan view illustrating the fuel cell unit according to the present disclosure;

FIG. 6D is another partial plan view illustrating the fuel cell unit according to the present disclosure;

FIG. 6E is a partial sectional view illustrating the fuel cell unit according to the present disclosure;

FIG. 7A is a partial perspective view illustrating the fuel cell unit according to the present disclosure;

FIG. 7B is a partial plan view illustrating the fuel cell unit according to the present disclosure;

FIG. 7C is a partial sectional view illustrating the fuel cell unit according to the present disclosure; and FIG. 8 is a schematic sectional view illustrating a single cell according to the present disclosure.

DETAILED DESCRIPTION OF EMBODIMENTS

A fuel cell unit according to the present disclosure will be described in detail below. Each figure that will be described below is a schematic diagram, and the size and shape of each part are shown exaggerated as appropriate in the figures in order to facilitate understanding. In the present specification, when the term "above" or "below" is used to describe how one member is disposed with respect to another member, it includes a case where the one member is disposed in contact with, or directly above or directly below, the another member and a case where the one member is disposed above or below the another member with still another member interposed therebetween, unless otherwise specified.

In the present disclosure, when a member is described without using a term such as "first" or "second," the member refers to both the "first" member and the "second" member, unless otherwise specified.

In the present disclosure, the term "orthogonal" not only means exactly orthogonal but also includes a case where the angle between two directions is 80° or more and 100° or less. This angle may be 85° or more and 95° or less. In the present disclosure, the term "parallel" not only means exactly parallel but also includes a case where the angle between two directions is 10° or less. This angle may be 5° or less.

1. Configuration of Fuel Cell Unit

Figure 1:
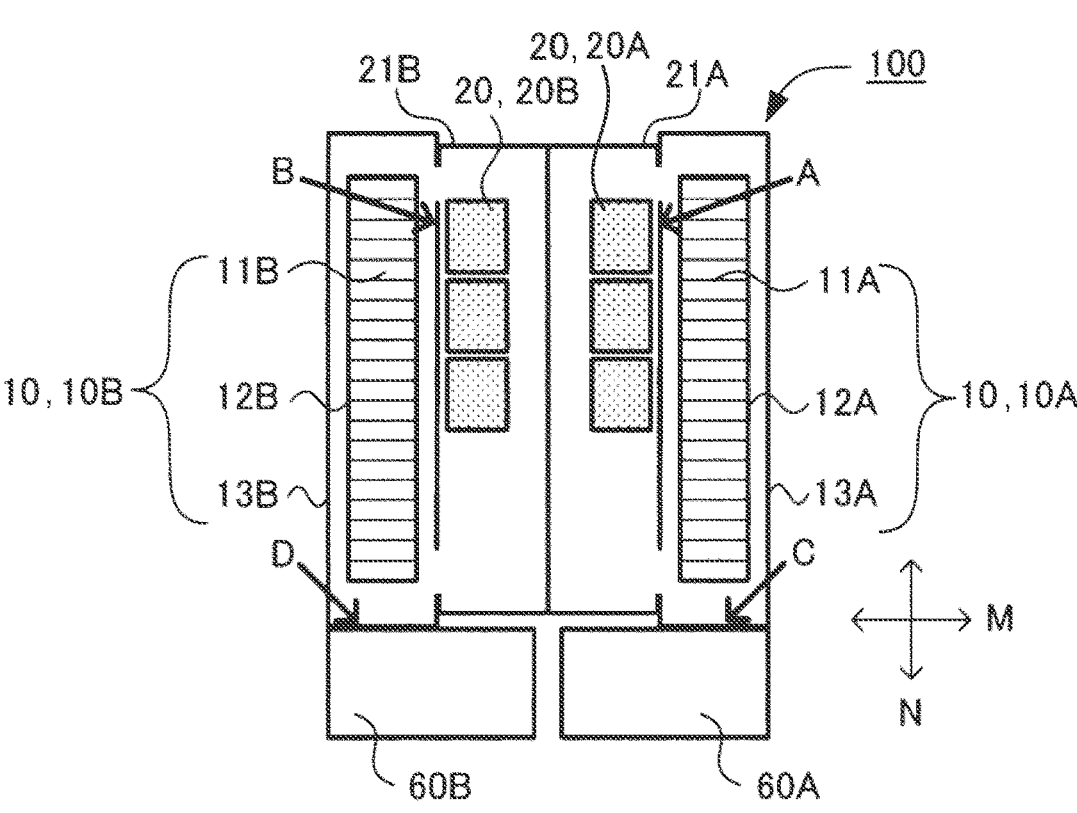
FIG. 1 is a schematic sectional view illustrating a fuel cell unit according to the present disclosure.

FIG. 1 is a schematic plan view illustrating the fuel cell unit according to the present disclosure. As shown in FIG. 1, a fuel cell unit 100 includes a fuel cell module and a power converter 20 that converts the power of the fuel cell module 10. The fuel cell unit 100 includes, as the fuel cell module 10, a first fuel cell module 10A and a second fuel cell module 10B. The first fuel cell module 10A includes a first fuel cell stack 12A that is a stack of a plurality of first single cells 11A. The second fuel cell module 10B includes a second fuel cell stack 12B that is a stack of a plurality of second single cells 11B. The fuel cell unit 100 includes, as the power converter 20, a first power converter 20A and a second power converter 20B. The first power converter 20A converts the power of the first fuel cell module 10A, and the second power converter 20B converts the power of the second fuel cell module 10B.

As shown in FIG. 1, in the fuel cell unit 100, the first power converter 20A is located on a first surface A of the first fuel cell module 10A, and the second power converter 20B is located on a first surface B of the second fuel cell module 10B. The first surface A and the first surface B face each other. A first normal direction M to the first surface A and the first surface B is orthogonal to a stacking direction N of the first single cells 11A and the second single cells 11B. In the present disclosure, the normal direction to the first surface A and the normal direction to the first surface B are parallel, and the stacking direction of the first single cells and the stacking direction of the second single cells are parallel.

According to the present disclosure, the first power converter is located on the predetermined first surface A of the first fuel cell module, the second power converter is located on the predetermined first surface B of the second fuel cell module, and the first normal direction to the first surface A and the first surface B is orthogonal to the stacking direction of the first single cells and the second single cells. Therefore, the fuel cell unit has good mountability. For example, members such as terminals that are connected to the power converter can be provided so as to protrude from the same surface of the fuel cell module, and connection members such as wire harnesses extending from each power converter (power converter case) can be easily put together. The mountability is thus improved. In particular, when the power converters are housed in a single power converter case, the integrated connection members can be extended from this power converter case. The mountability is thus further improved.

Figure 2:
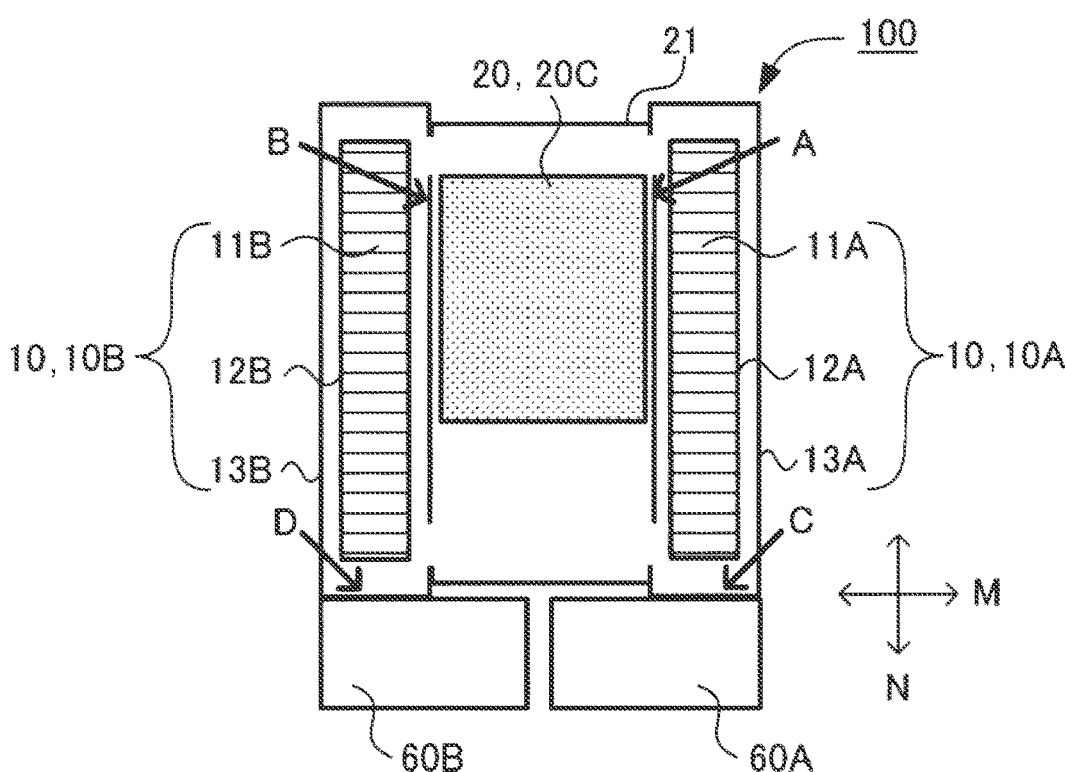
FIG. 2 is another schematic sectional view illustrating the fuel cell unit according to the present disclosure.

As shown in FIG. 2, the fuel cell unit according to the present disclosure may include, as the power converter 20, a common power converter 20C that converts the power of the first fuel cell module 10A and also converts the power of the second fuel cell module 10B. The common power converter 20C is located on the first surface A of the first fuel cell module 10A and is also located on the first surface B of the second fuel cell module 10B. The configuration of the fuel cell unit 100 shown in FIG. 2 is similar to that of the fuel cell unit 100 shown in FIG. 1 except the common power converter 20C.

According to the present disclosure, the common power converter can convert the power of the first fuel cell module and the power of the second fuel cell module. That is, the single power converter can serve as both the first power converter and the second power converter. Therefore, the size of the power converter and the size of the power converter case can be reduced. As a result, the mountability is further improved.

The structure of the fuel cell unit according to the present disclosure can be regarded as a structure in which a power converter is sandwiched between two fuel cell modules. This structure is advantageous in that the power converter can serve as an impact absorber when an impact is applied to the fuel cell unit, providing better collision safety.

Figure 3:
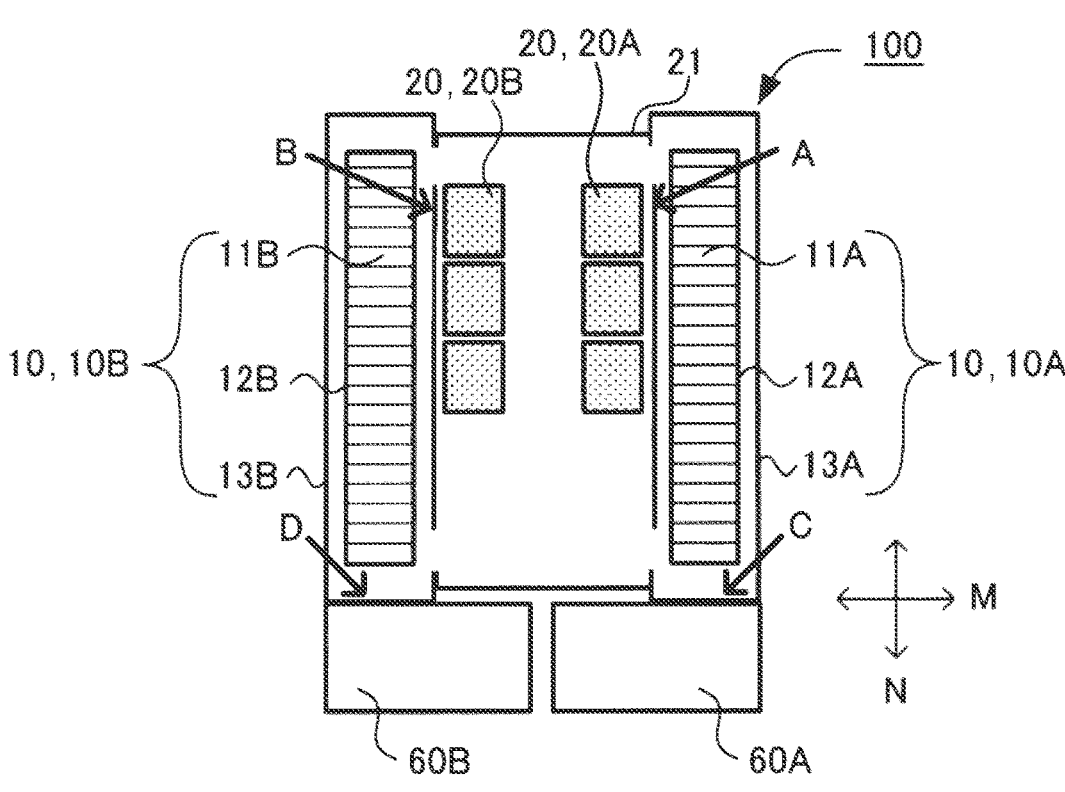
FIG. 3 is another schematic sectional view illustrating the fuel cell unit according to the present disclosure.

As shown in FIGS. 1 to 3, the first fuel cell module 10A typically has a fuel cell case 13A that houses the first fuel cell stack 12A. Similarly, the second fuel cell module typically has a fuel cell case 13B that houses the second fuel cell stack 12B. The fuel cell cases 13A, 13B each have an opening for electrical connection with the first power converter 20A and the second power converter 20B, respectively, or with the common power converter 20C. This opening is typically formed in the first surface A and the first surface B.

As shown in FIG. 1, the first power converter 20A and the second power converter 20B may be housed in separate power converter cases (21A, 21B). The "separate power converter cases" mean that the case housing the first power converter 20A and the case housing the second power converter 20B do not communicate with each other. In this case, the fuel cell case 13A and the power converter case 21A are preferably connected through the opening. Similarly, the fuel cell case 13B and the power converter case 21B are preferably connected through the opening.

Alternatively, as shown in FIGS. 2 and 3, both the first power converter 20A and the second power converter 20B, or the common power converter 20C, may be housed in a single power converter case 21. As shown in FIG. 3, in the case where the first power converter 20A and the second power converter 20B are separate power converters, the "single power converter case" means that the case housing the first power converter 20A and the case housing the second power converter 20B communicate with each other to serve as a single power converter case. In this case, the fuel cell case 13A, the power converter case 21, and the fuel cell case 13B are preferably connected through the openings.

Figure 4:
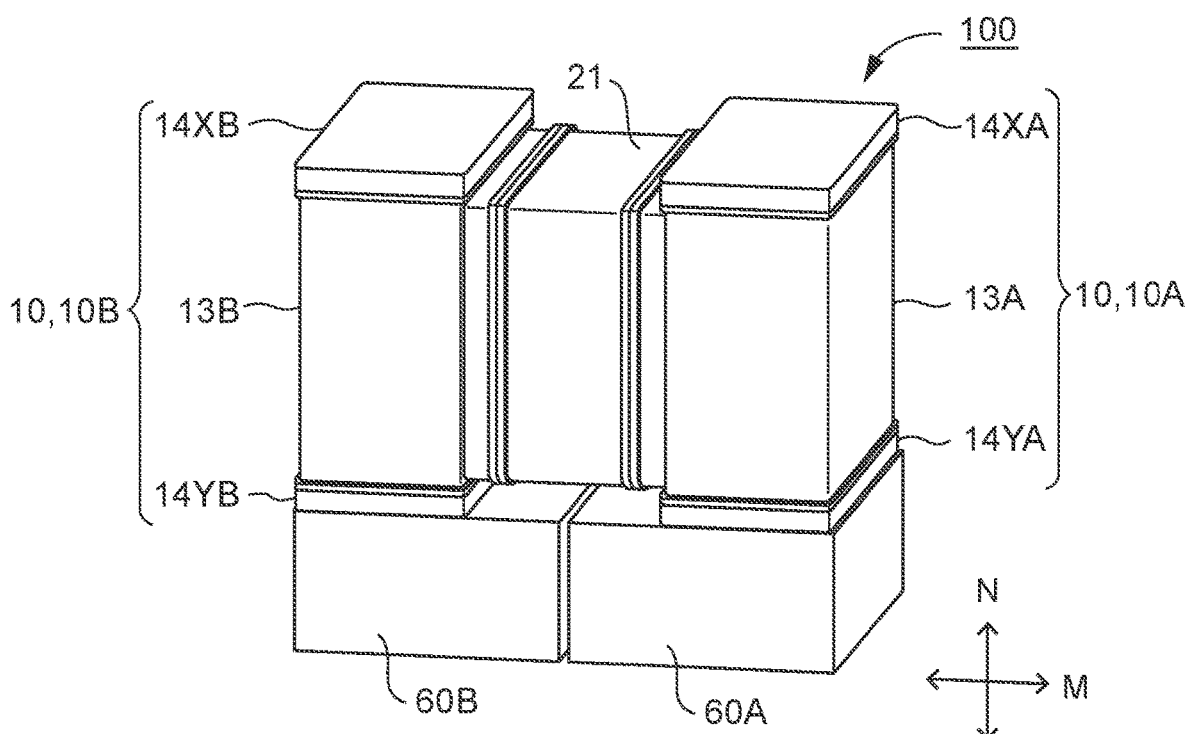
FIG. 4 is an external perspective view illustrating the fuel cell unit according to the present disclosure.

FIG. 4 is an external perspective view illustrating the fuel cell unit according to the present disclosure. Specifically, FIG. 4 is an external perspective view illustrating the fuel cell unit in which the power converter 20 is housed in the single power converter case 21. As shown in FIG. 4, in the fuel cell modules (10A, 10B), end plates X (14XA, 14XB) are located on one ends of the fuel cell cases (13A, 13B), and end plates Y (14YA, 14YB) are located on the other ends of the fuel cell cases (13A, 13B) that face the end plates X. Auxiliary devices (first auxiliary device 60A, second auxiliary device 60B) are fixed to the end plates Y (14YA, 14YB).

As shown in FIGS. 1 to 4, the fuel cell unit 100 may include the first auxiliary device 60A that assists in operation of the first fuel cell module 10A, and the second auxiliary device 60B that assists in operation of the second fuel cell module 10B. As shown in FIGS. 1 to 3, the first auxiliary device 60A is located on a second surface C of the first fuel cell module 10A, the second auxiliary device 60B is located on a second surface D of the second fuel cell module 10B, and a second normal direction to the second surface C and the second surface D is orthogonal to the first normal direction M to the first surface A and the first surface B. The first auxiliary device 60A and the second auxiliary device 60B face each other. The second surface C and the second surface D are preferably the lower surfaces of the fuel cell modules in the direction of gravity. In the present disclosure, the normal direction to the second surface C and the normal direction to the second surface D are parallel.

As shown in FIGS. 1 to 3, the first auxiliary device 60A preferably protrudes beyond the first fuel cell module 10A toward the power converter 20 in the first normal direction M to the first surface A and the first surface B, and the second auxiliary device 60B preferably protrudes beyond the second fuel cell module 10B toward the power converter 20 in the first normal direction M to the first surface A and the first surface B.

Each of the first auxiliary device and the second auxiliary device may be an integrated auxiliary unit composed of at least two auxiliary devices. Alternatively, each of the first auxiliary device and the second auxiliary device may be a single auxiliary device.

In the case where both the first power converter and the second power converter, or the common power converter, is housed in the single power converter case, the first fuel cell module and the second fuel cell module may be connected in parallel or may be connected in series.

Figure 5A:
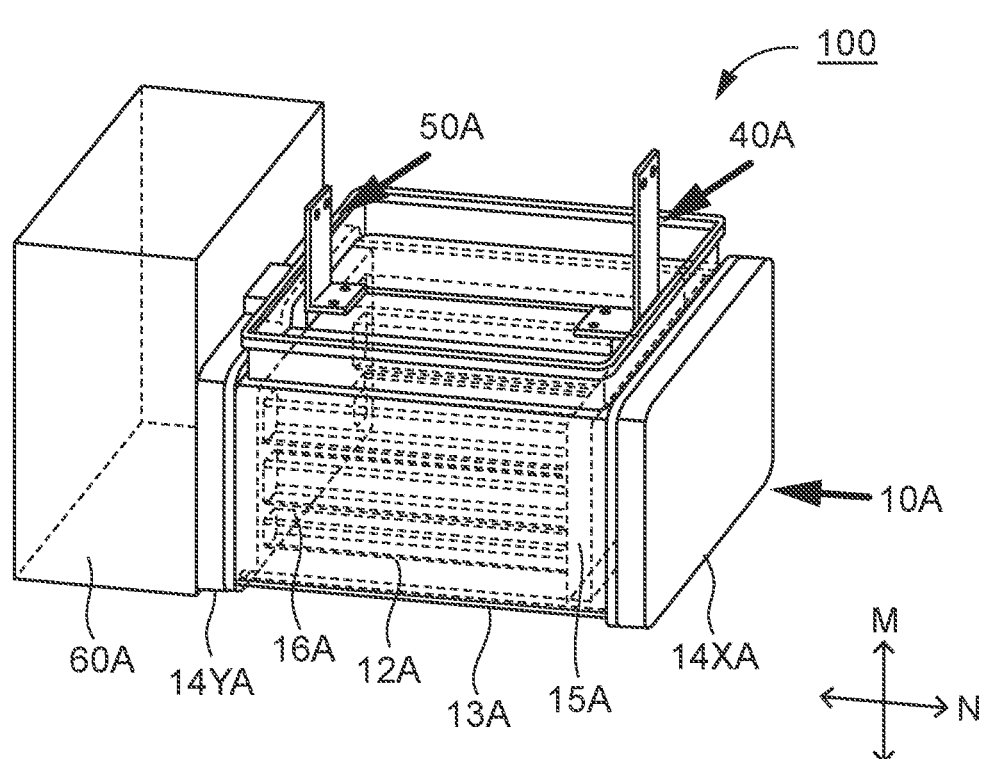
FIG. 5A is a diagram illustrating connection between fuel cell modules.
Figure 5B:
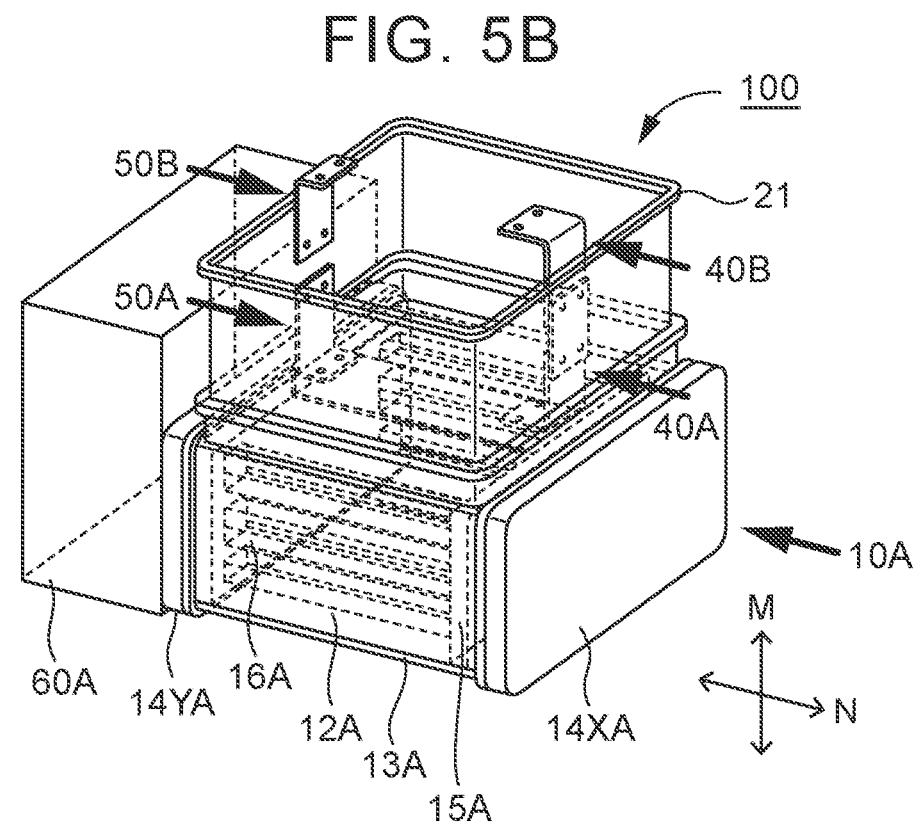
FIG. 5B is another diagram illustrating connection between the fuel cell modules.

FIGS. 5A and 5B illustrate connection between the fuel cell modules. Specifically, FIGS. 5A and 5B are partial perspective views illustrating a positive terminal and negative terminal of the first fuel cell module in the fuel cell unit in which both the first power converter and the second power converter, or the common power converter, is housed in the single power converter case. For example, as shown in FIG. 5A, in the case where the power converter is housed in the single fuel cell converter case, it is possible to electrically connect the first fuel cell module and the second fuel cell module inside the power converter case using predetermined terminals. However, if either or both of positive terminals (40A, 40B) and negative terminals (50A, 50B) of the first and second fuel cell modules interfere with (directly contact) each other as shown in FIG. 5B, it is difficult to electrically connect the first fuel cell module and the second fuel cell module.

Therefore, in the case where both the first power converter and the second power converter, or the common power converter, is housed in the single power converter case, the fuel cell unit according to the present disclosure preferably has the following aspect. The first fuel cell module includes: a first positive terminal plate located on the positive electrode side of the first fuel cell stack; a first negative terminal plate located on the negative electrode side of the first fuel cell stack; and a first fuel cell case housing the first fuel cell stack, the first positive terminal plate, and the first negative terminal plate. The second fuel cell module includes: a second positive terminal plate located on the positive electrode side of the second fuel cell stack; a second negative terminal plate located on the negative electrode side of the second fuel cell stack; and a second fuel cell case housing the second fuel cell stack, the second positive terminal plate, and the second negative terminal plate. The fuel cell unit further includes: a first positive terminal connected to the first positive terminal plate and protruding from the first fuel cell case toward the power converter; a first negative terminal connected to the first negative terminal plate and protruding from the first fuel cell case toward the power converter; a second positive terminal connected to the second positive terminal plate and protruding from the second fuel cell case toward the power converter; and a second negative terminal connected to the second negative terminal plate and protruding from the second fuel cell case toward the power converter. The first positive terminal includes a base A1 (a first base) connected to the first positive terminal plate, and a protruding portion A1 (a first protruding portion) protruding from the base A1 toward the power converter. The first negative terminal includes a base A2 (a second base) connected to the first negative terminal plate, and a protruding portion A2 (a second protruding portion) protruding from the base A2 toward the power converter. The second positive terminal includes a base B1 (a third base) connected to the second positive terminal plate, and a protruding portion B1 (a third protruding portion) protruding from the base B1 toward the power converter. The second negative terminal includes a base B2 (a forth base) connected to the second negative terminal plate, and a protruding portion B2 (a forth protruding portion) protruding from the base B2 toward the power converter. The fuel cell unit satisfies either or both of the following conditions (1) and (2).

(1) The protruding portion A1 of the first positive terminal and the protruding portion B1 of the second positive terminal are located so as not to overlap each other as viewed in plan in the stacking direction.

(2) The protruding portion A2 of the first negative terminal and the protruding portion B2 of the second negative terminal are located so as not to overlap each other as viewed in plan in the stacking direction.

According to the fuel cell unit of the above aspect, the fuel cell modules can be easily connected to each other.

The fuel cell unit that satisfies at least the condition (1) preferably satisfies the following condition (3).

(3) The protruding portion A1 of the first positive terminal and the protruding portion B1 of the second positive terminal are located on the same section perpendicular to the stacking direction.

The fuel cell unit that satisfies at least the condition (2) preferably satisfies the following condition (4).

(4) The protruding portion A2 of the first negative terminal and the protruding portion B2 of the second negative terminal are located on the same section perpendicular to the stacking direction.

One possible way to avoid interference between the positive terminals and between the negative terminals is to shift the positions of the protruding portions of the terminals (protruding positions of the terminals) from each other in the stacking direction of the single cells. However, this may increase the size of the fuel cell unit. In the fuel cell unit that satisfies either or both of the conditions (3) and (4), the positions of the protruding portions of the terminals can be shifted from each other in the direction orthogonal to the stacking direction of the single cells. Therefore, the fuel cell modules can be easily connected to each other without increasing the size of the fuel cell unit.

The "section perpendicular to the stacking direction" includes not only a case where the angle between the section and the stacking direction of the single cells is exactly perpendicular, but also a case where this angle is 80° or more and 100° or less. This angle may be 85° or more and 95° or less.

The above aspect will be described in more detail. FIGS. 6A to 6E are a partial perspective view, partial enlarged view, partial plan views, and partial sectional view illustrating the fuel cell unit according to the present disclosure. Specifically, FIG. 6A is a schematic view illustrating an example of a method for connecting the first fuel cell module and the second fuel cell module in the fuel cell unit shown in FIG. 4. FIG. 6B is an enlarged view of the first positive terminal 40A and the second positive terminal 40B in FIG. 6A. FIGS. 6C and 6D are schematic plan views of the fuel cell unit in FIG. 6A as viewed in the first normal direction to the first surface A and the first surface B. FIG. 6C is a plan view as viewed from the first fuel cell module side. FIG. 6D is a plan view as viewed from the second fuel cell module side. FIG. 6E is a schematic plan view (schematic sectional view) of the fuel cell unit shown in FIG. 6A as viewed in the stacking direction of the single cells. The fuel cell unit shown in FIGS. 6A to 6E satisfies the above conditions (1) and (3).

As shown in FIGS. 6A and 6B, in the case where the power converter is housed in the single power converter case, the first positive terminal 40A preferably includes a base A1 (41A) connected to a first positive terminal plate 15A, and a protruding portion A1 (42A) protruding from the base A1 (41A) toward the power converter (power converter case 21). The first negative terminal 50A preferably includes a base A2 (not shown) connected to a first negative terminal plate 16A, and a protruding portion A2 (not shown) protruding from the base A2 toward the power converter (power converter case 21). The second positive terminal (40B) preferably includes a base B1 (41B) connected to a second positive terminal plate (not shown), and a protruding portion B1 (42B) protruding from the base B1 (41B) toward the power converter (power converter case 21). The second negative terminal (50B) preferably includes a base B2 (not shown) connected to a second negative terminal plate (not shown), and a protruding portion B2 (not shown) protruding from the base B2 toward the power converter (power converter case 21). As shown in FIGS. 6A and 6B, the normal direction to the base A1 (41A) and the normal direction to the base B1 (41B) are preferably parallel to the first normal direction M to the first surface A and the first surface B, and the direction in which the protruding portion A2 (42A) protrudes and the direction in which the protruding portion B2 (42B) protrudes are preferably parallel to the normal direction to the base A1 (41A), the normal direction to the base B1 (41B), and the first normal direction M to the first surface A and the first surface B.

As shown in FIGS. 6C and 6D, the base A1 (41A) and the base B1 (41B) are preferably located so as to at least partially overlap each other when the fuel cell unit is viewed in plan in the first normal direction to the first surface of the fuel cell module. In FIGS. 6C and 6D, the base B1 (41B) on the second fuel cell module side extends more than the base portion A1 (41A) on the first fuel cell module side in a direction D orthogonal to the stacking direction N of the single cells.

As shown in FIGS. 6C and 6D, each of the base A1 (41A) and the base B1 (41B) is preferably located in the middle portion of the fuel cell stack in the direction D orthogonal to the stacking direction N of the single cells. "Located in the middle portion of the fuel cell stack" means that at least one of the ends of the base in the direction D is located in the range of 0.4 L or more and 0.6 L or less from an end of the fuel cell stack as viewed in plan like FIGS. 6C and 6D, where L is the length of the fuel cell stack in the direction D.

By arranging the base A1 and the base B1 as described above, the protruding portion A1 (42A) of the first positive terminal 40A and the protruding portion B1 (42B) of the second positive terminal 40B can be located on the same section P perpendicular to the stacking direction N, and the protruding portion A1 (42A) of the first positive terminal 40A and the protruding portion B1 (42B) of the second positive terminal 40B can be located so as not to overlap each other as viewed in plan in the stacking direction N, as shown in FIG. 6E. As a result, as shown in FIG. 6A, the negative terminal 50A connected to the first fuel cell module and the positive terminal 40B connected to the second fuel cell module can be connected through an electrically conductive member 70 without interference between the positive terminals, and the first and second fuel cell modules can be electrically connected in series.

The negative terminals may be arranged like the positive terminals shown in FIGS. 6A to 6E. The fuel cell unit that satisfies the above conditions (2) and (4) can thus be obtained.

FIGS. 7A to 7C are a partial perspective view, partial plan view, and partial sectional view illustrating the fuel cell unit according to the present disclosure. Specifically, FIG. 7A is a schematic view illustrating an example of a method for connecting the first fuel cell module and the second fuel cell module shown in FIG. 4. FIG. 7B is a schematic plan view of the fuel cell unit shown in FIG. 7A as viewed in the first normal direction to the first surface. FIG. 7C is a schematic plan view (schematic sectional view) of the fuel cell unit shown in FIG. 7A as viewed in the stacking direction of the single cells. The fuel cell unit shown in FIGS. 7A to 7C satisfies the above conditions (1) and (3).

As shown in FIG. 7A, in the above aspect, the first positive terminal 40A preferably includes the base A1 (41A) and the protruding portion A1 (42A) protruding from the base A1 (41A) toward the power converter (power converter case 21), and the second positive terminal 40B preferably includes the base B1 (41B) and the protruding portion B1 (42B) protruding from the base B1 (41B) toward the power converter (power converter case 21). As shown in FIG. 7B, in the fuel cell unit 100, the base A1 (41A) and the base B1 (41B) are preferably located so as not to overlap each other as viewed in plan in the first normal direction M to the first surface A and the first surface B.

Both bases need not necessarily be located in the middle portion of the fuel cell stack. One of the bases may be located in the middle portion of the fuel cell stack, and the other base may not be located in the middle portion of the fuel cell stack. The middle portion of the fuel cell stack is as described above.

By arranging the base A1 and the base B1 as described above, the protruding portion A1 (42A) of the first positive terminal 40A and the protruding portion B1 (42B) of the second positive terminal 40B can be located on the same section P perpendicular to the stacking direction N, and the protruding portion A1 (42A) of the first positive terminal 40A and the protruding portion B1 (42B) of the second positive terminal 40B can be located so as not to overlap each other as viewed in plan in the stacking direction N, as shown in FIG. 7C. As a result, as shown in FIG. 7A, the negative terminal 50A connected to the first fuel cell module and the positive terminal 40B connected to the second fuel cell module can be connected through the electrically conductive member 70 without interference between the positive terminals, and the first and second fuel cell modules can be electrically connected in series.

The negative terminals may be arranged like the positive terminals shown in FIGS. 7A to 7C. The fuel cell unit that satisfies the above conditions (2) and (4) can thus be obtained.

2. Members of Fuel Cell Unit (1) Fuel Cell Module

The fuel cell unit according to the present disclosure includes, as the fuel cell module, the first fuel cell module and the second fuel cell module. Each of the first fuel cell module and the second fuel cell module includes at least a fuel cell stack that is a stack of a plurality of single cells.

(i) Fuel Cell Stack

In the fuel cell stack according to the present disclosure, a plurality of single cells is stacked. The number of single cells (number of stacked single cells) is typically two or more, and may be five or more, or may be 10 or more. The number of stacked first single cells in the first fuel cell stack and the number of stacked second single cells in the second fuel cell stack may be the same or different.

A fuel cell (single cell) 11 shown in FIG. 8 includes a membrane electrode assembly (MEA) 6 and two separators 7 sandwiching the MEA 6 therebetween. In the MEA 6, a cathode-side gas diffusion layer 1, a cathode catalyst layer 2, an electrolyte membrane 3, an anode catalyst layer 4, and an anode-side gas diffusion layer 5 are stacked in this order. The materials of the first single cell and the materials of the second single cell may be the same or different.

Examples of the electrolyte membrane include a fluorine electrolyte membrane such as a perfluorosulfonic acid membrane and a non-fluorine electrolyte membrane. An example of the non-fluorine electrolyte membrane is a hydrocarbon electrolyte membrane. The thickness of the electrolyte membrane is, for example, 5 μm or more and 100 μm or less.

The cathode catalyst layer and the anode catalyst layer contain, for example, a catalyst metal that accelerates an electrochemical reaction, a base material that supports the catalyst metal, a proton-conductive electrolyte, and electron-conductive carbon particles. Examples of the catalyst metal include simple metals such as platinum (Pt) and ruthenium (Ru), and alloys containing Pt. Examples of the electrolyte include fluorine resins. Examples of the base material and an electrically conductive material include carbon materials such as carbon. The thicknesses of the cathode catalyst layer and the anode catalyst layer are each, for example, 5 μm or more and 100 μm or less.

The anode-side gas diffusion layer and the cathode-side gas diffusion layer may be gas permeable, electrically conductive members. Examples of the electrically conductive member include porous carbon materials such as carbon cloth and carbon paper, and porous metal materials such as metal mesh and metal foam. The thicknesses of the anode-side gas diffusion layer and the cathode-side gas diffusion layer are each, for example, 5 μm or more and 100 μm or less.

Each separator may have gas channels on its surface facing the gas diffusion layers (anode-side gas diffusion layer and cathode-side gas diffusion layer). Examples of the material of the separators include metal materials such as stainless steel, and carbon materials such as carbon composite materials. Each separator is electron-conductive and serves also as a collector for generated electricity.

(ii) Terminal Plates

The fuel cell module typically has terminal plates on the positive and negative electrode sides of the fuel cell stack. The terminal plates are used to output the power generated by the fuel cell stack. The material of each terminal plate may be, for example, a metal material such as copper, aluminum, or alloy containing these, or an electrically conductive material such as dense carbon. The shape and size of each terminal plate can be adjusted as appropriate.

(iii) Fuel Cell Case

The fuel cell case may be of any shape that can house the fuel cell stack and the terminal plates.

(2) Power Converter

The position of the power converter in the present disclosure is as described above.

The power converter is not particularly limited as long as it is a member that converts the power of the fuel cell module. The power converter may be a converter such as a boost converter, a buck converter, or a buck-boost converter that can perform both buck and boost operations, or may be an inverter that converts direct current power to alternating current power. The fuel cell unit may include one of the above types of members as the power converter, or may include two or more of the above types of members as the power converter.

The power converter is typically housed in the power converter case. The power converter case typically has an opening in its surface facing the fuel cell case. The power converter case may have a lid. The power converter case is joined to the fuel cell case by joining members such as bolts. The outer shape of the power converter case is preferably a rectangular parallelepiped. Examples of the material of the power converter case include metal materials such as aluminum alloys.

(3) Positive Terminal and Negative Terminal

The positive terminal and the negative terminal are connected to the positive terminal plate and the negative terminal plate, respectively. The positive terminal and the negative terminal are each a member for electrically connecting the fuel cell modules and a member for outputting power generated by the fuel cell stack to the power converter. Examples of the material of the positive terminal and the negative terminal include metal materials such as copper, aluminum, and alloys containing these. The positive terminal and the negative terminal are connected at their bases to the terminal plates.

(4) Auxiliary Devices

The positions of the auxiliary devices in the present disclosure are as described above.

Examples of the auxiliary devices include: an air compressor for supplying an oxidant gas to the fuel cell stack; an injector for supplying a fuel gas to the fuel cell stack; a circulation pump for supplying a fuel off-gas to the fuel cell; an electric pump for supplying a coolant to the fuel cell; a humidification module for humidifying either or both of a fuel gas and an oxidant gas to be supplied to the fuel cell stack; and a valve for allowing and shutting off the flow of at least one of the following: a fuel gas, a oxidant gas, and a coolant. The auxiliary devices may be one type of devices, or may be two or more types of devices.

In the case where the auxiliary devices are integrated auxiliary units each composed of a plurality of auxiliary devices, each auxiliary device (auxiliary unit) may be housed in a desired case. Examples of the material of the auxiliary device case include metal materials such as aluminum alloys.

3. Fuel Cell Unit

Applications of the fuel cell unit according to the present disclosure include, for example, vehicles such as fuel cell electric vehicles (FCEVs). The fuel cell unit according to the present disclosure may also be used in moving bodies other than vehicles (e.g., trains, ships, and aircraft), and may be used in applications other than moving bodies.

The present disclosure is not limited to the above embodiments. The above embodiment is illustrative, and anything having substantially the same configuration as, and having similar functions and effects to, the technical idea described in the claims of the present disclosure is included in the technical scope of the present disclosure.

What is claimed is:

1. A fuel cell unit comprising:

a fuel cell module; and a power converter configured to convert power of the fuel cell module, wherein:

the fuel cell module includes a first fuel cell module including a first fuel cell stack that is a stack of a plurality of first single cells, and a second fuel cell module including a second fuel cell stack that is a stack of a plurality of second single cells;

the power converter includes a first power converter configured to convert power of the first fuel cell module, and a second power converter configured to convert power of the second fuel cell module;

the first power converter is located on a first surface of the first fuel cell module;

the second power converter is located on a first surface of the second fuel cell module;

the first surface of the first fuel cell module and the first surface of the second fuel cell module face each other; and a first normal direction to the first surface of the first fuel cell module and the first surface of the second fuel cell module is orthogonal to a stacking direction of the first single cells and the second single cells.

2. The fuel cell unit according to claim 1, wherein the first power converter and the second power converter are housed in separate power converter cases.

3. The fuel cell unit according to claim 1, wherein both the first power converter and the second power converter are housed in a single power converter case.

4. The fuel cell unit according to claim 1, the fuel cell unit further comprising:

a first auxiliary device configured to assist in operation of the first fuel cell module; and a second auxiliary device configured to assist in operation of the second fuel cell module, wherein:

the first auxiliary device is located on a second surface of the first fuel cell module;

the second auxiliary device is located on a second surface of the second fuel cell module;

a second normal direction to the second surface of the first fuel cell module and the second surface of the second fuel cell module is orthogonal to the first normal direction; and the first auxiliary device and the second auxiliary device face each other.

5. The fuel cell unit according to claim 4, wherein:

the first auxiliary device protrudes beyond the first fuel cell module toward the power converter in the first normal direction; and the second auxiliary device protrudes beyond the second fuel cell module toward the power converter in the first normal direction.

* * * * *